INVENTORS
Vernon F. Fladeland
Lawrence P. Vanderhagen
BY
Paul H. Blaustein
ATTORNEY

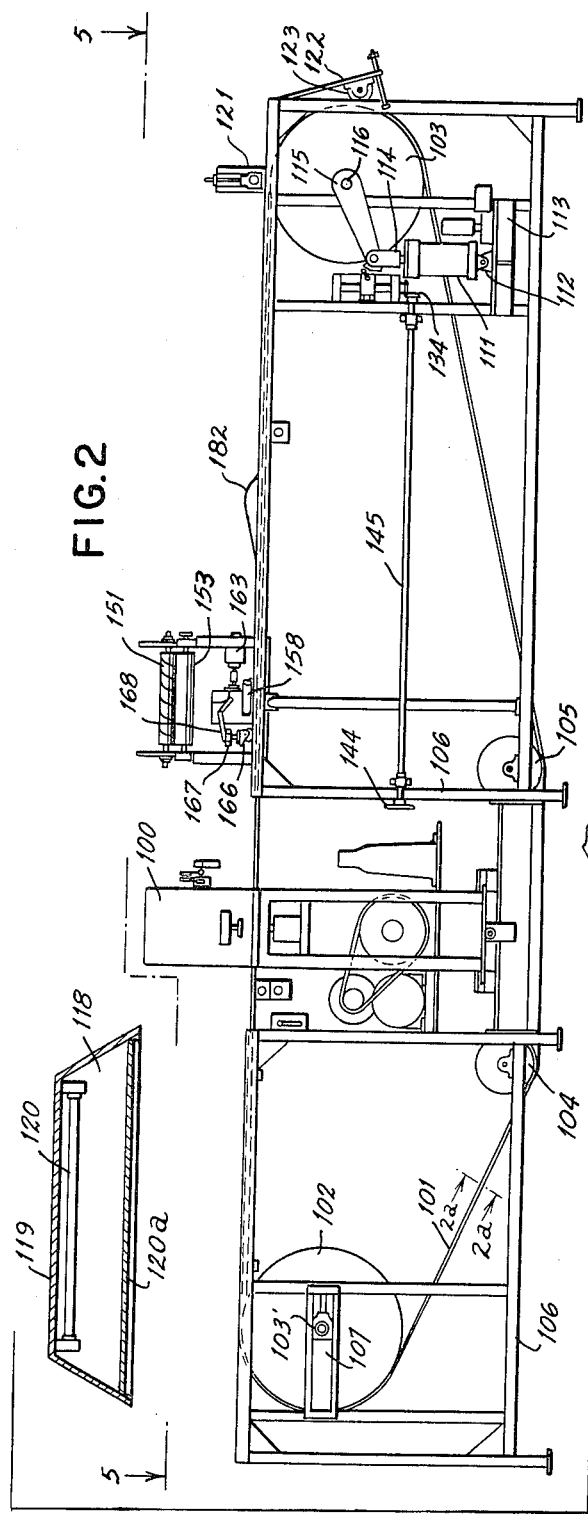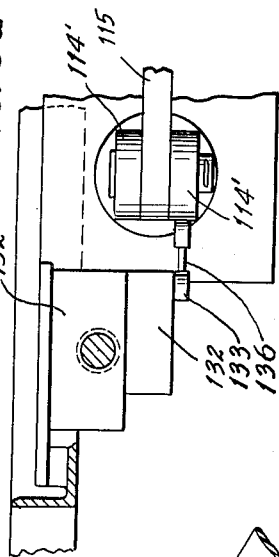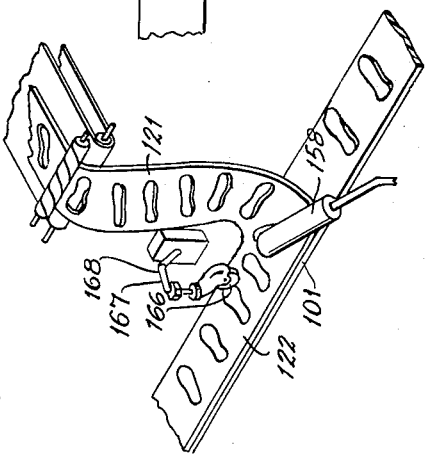
FIG. 2
FIG. 6a
FIG. 2b
INVENTORS
Vernon F. Fladeland
Lawrence P. Vanderhagen
BY
Paul Blaustein
ATTORNEY

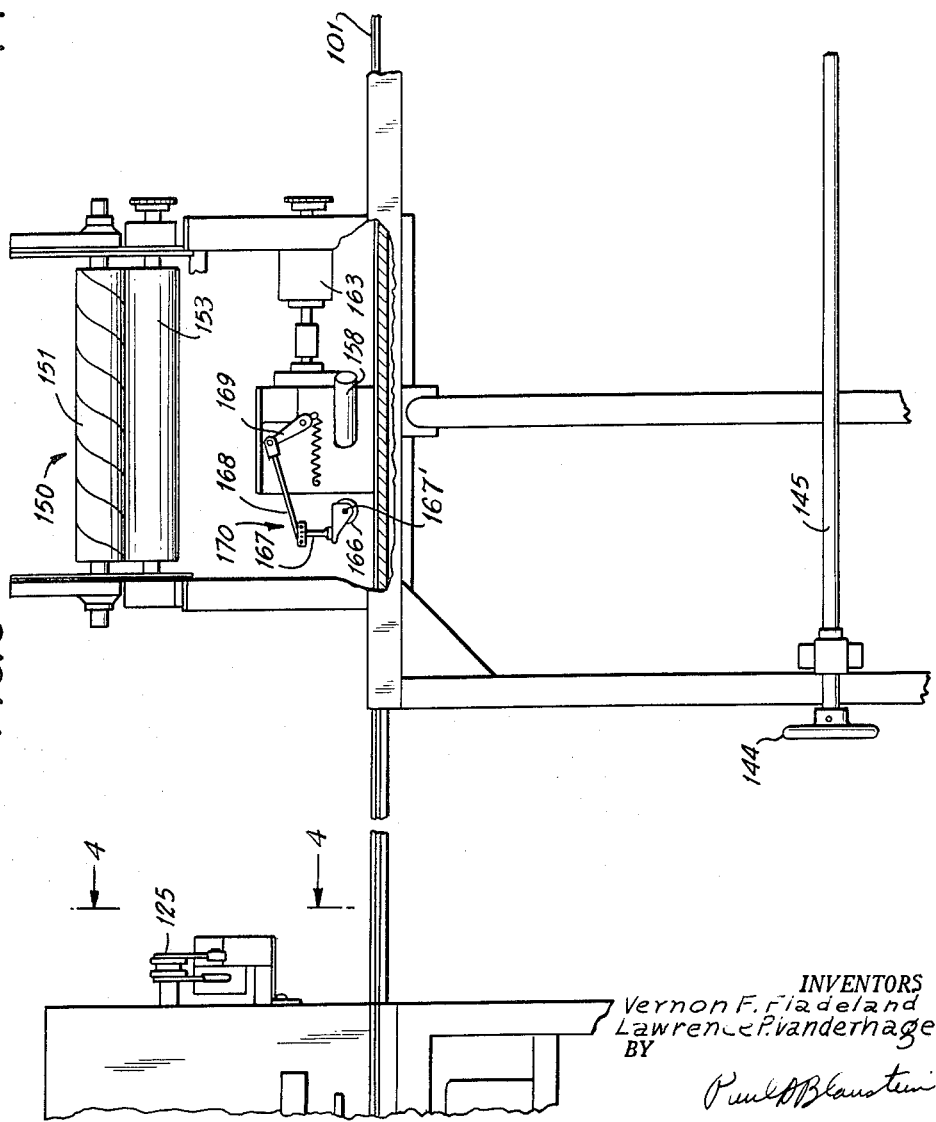
April 19, 1966 V. F. FLADELAND ETAL 3,246,352
SOLE CUTTING APPARATUS
Original Filed Feb. 9, 1961 7 Sheets-Sheet 3
INVENTORS
Vernon F. Fladeland
Lawrence P. Vanderhagen
BY
ATTORNEY

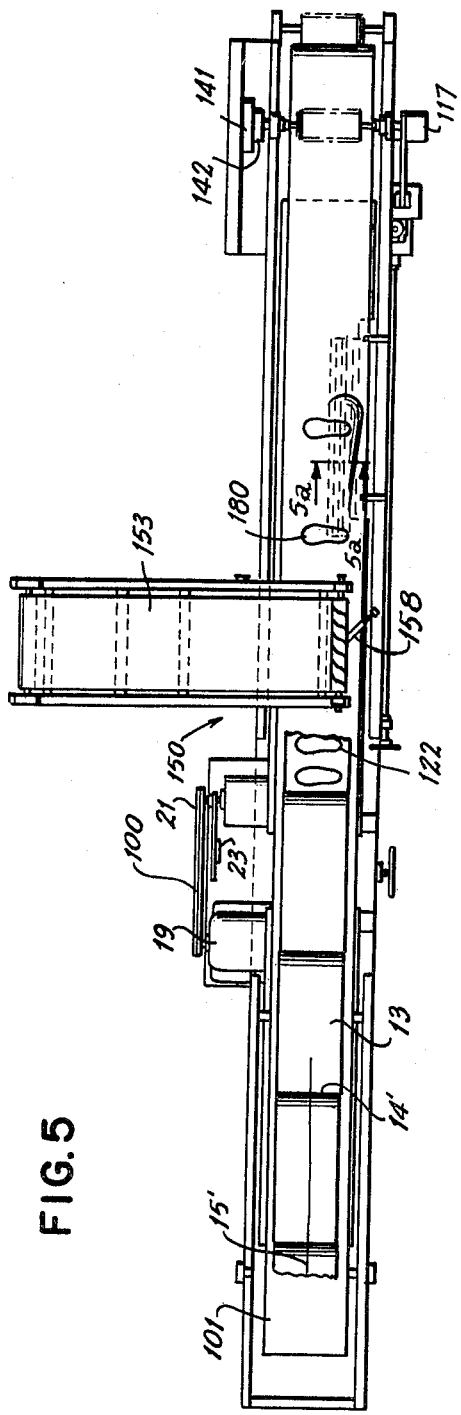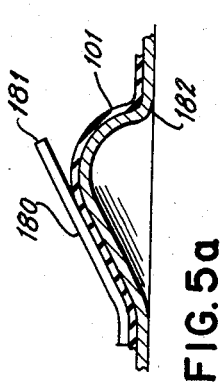

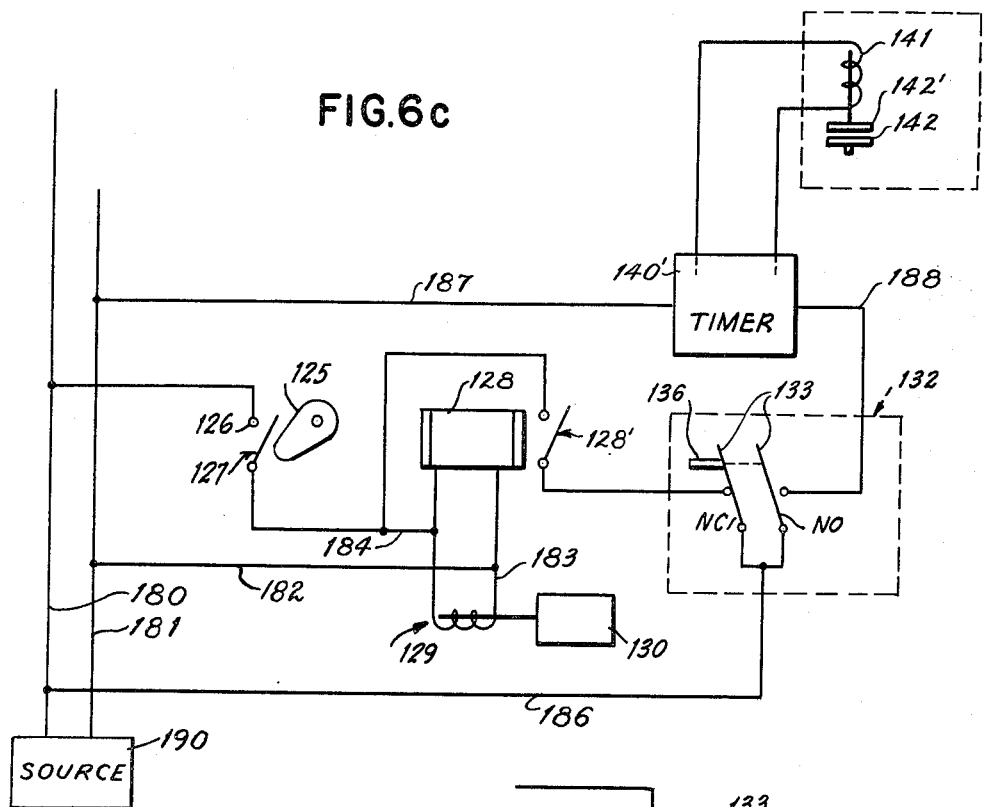
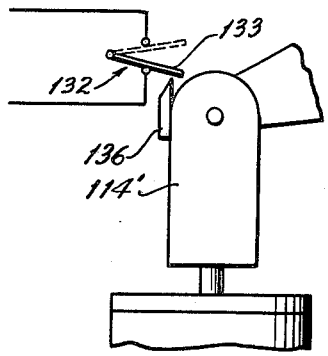
FIG. 6b
FIG. 2a

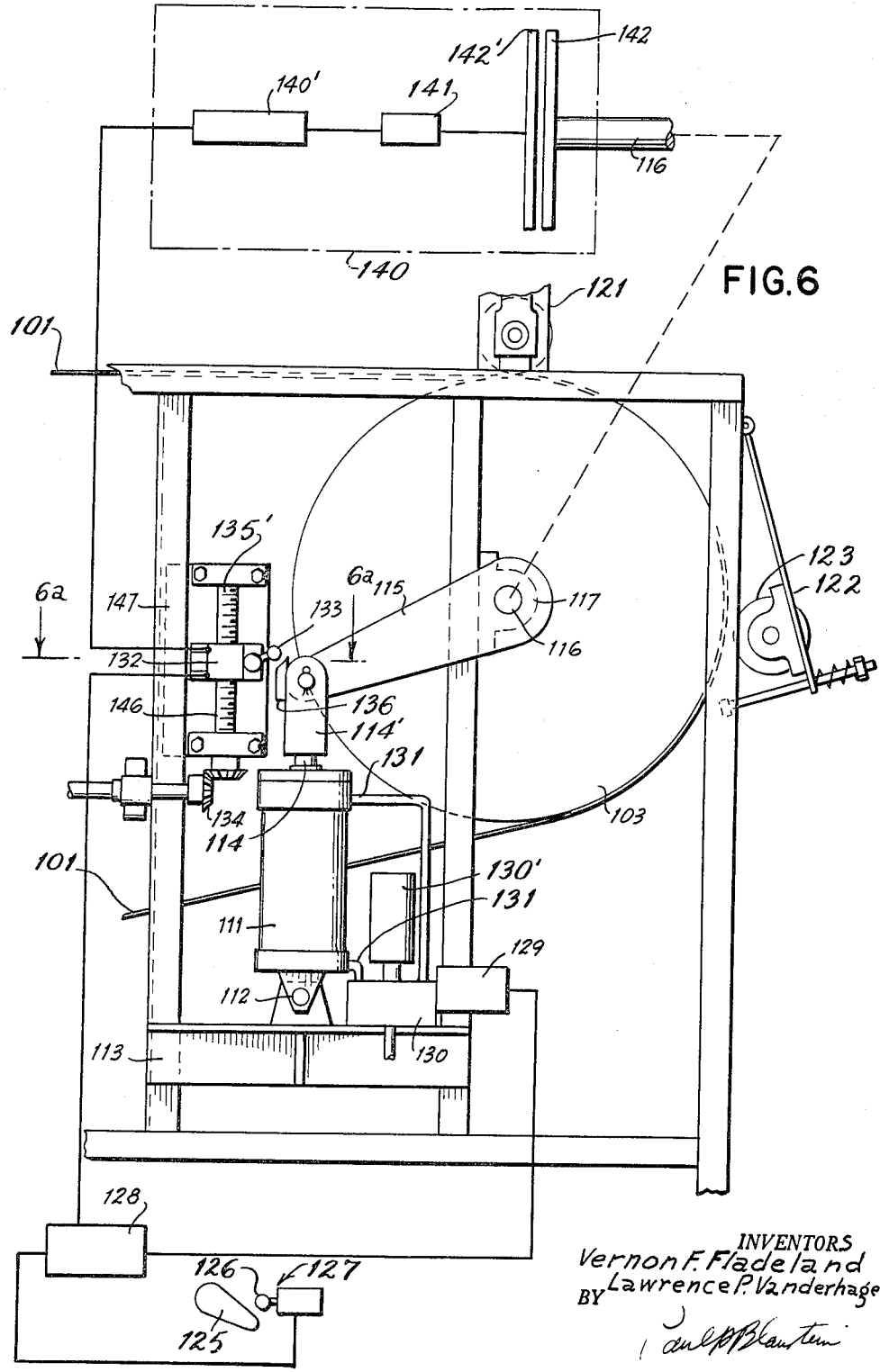

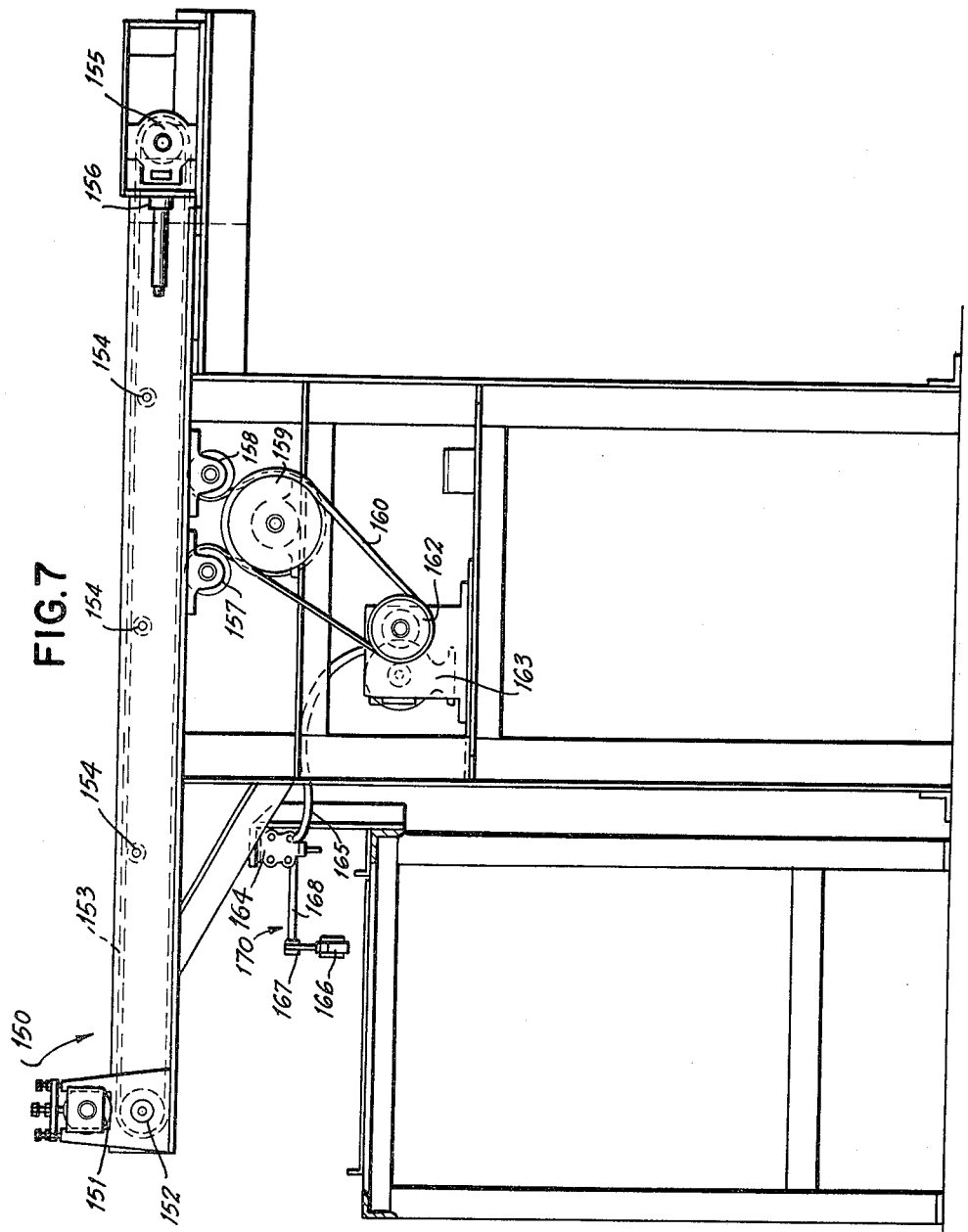

United States Patent Office 3,246,352
Patented Apr. 19, 1966

3,246,352
SOLE CUTTING APPARATUS
Vernon F. Fladeland, South Bend, and Lawrence P. Vanderhagen, Mishawaka, Ind., assignors to Wellman Company, Medford, Mass., a corporation of Maine
Continuation of application Ser. No. 95,769, Feb. 9, 1961. This application Mar. 7, 1963, Ser. No. 263,600
8 Claims. (Cl. 12—1)

This invention is useful in the manufacture of shoe soles. In particular, this invention relates to a process and apparatus for continuously cutting soles from sole forming material or stock by passing this stock through a sole cutting machine and thereafter removing the unused stock (the rind), from the cut soles in a continuous and rapid manner.

This application is a continuation of our copending application Serial No. 95,769, filed February 9, 1961, and now abandoned.

One object of this invention is to provide a continuous sole cutting process in which the soles are cut rapidly and accurately. Another object is to rapidly and automatically cut soles and remove the rind without disturbing the sole cutting machine or operation to leave the soles on their travelling cutting sheet or conveyor belt.

Another object of this invention is to provide automatic sole cutting from sole stock with little waste by utilizing precise alignment of the sole stock in the sole cutting machine.

A further object is to utilize the breast of the heel line formed in the sole stock material for stock alignment purposes.

A still further object of this invention is to provide automatic sole cutting in which the rind is removed without disturbing the sole stock being cut by controlling the speed of rind removal.

*Description of the system in general*

The sole stock from which shoe soles are cut, is placed on a conveyor belt so as to form a continuous length of stock. This stock is advanced by the conveyor belt to a cutting machine where the sole of desired contour is cut. This stock must be accurately positioned in the cutting machine in order to accurately form a sole of the desired contour with the heel breast line in proper relative position. While the stock is being cut, the conveyor belt is at rest. Thereafter, the stock is advanced intermittently to the rind removal system where an operator leads the rind through a pair of rollers to place the rind on a second scrap removal conveyor belt. The cut soles remain on the initial cutting conveyor belt and may then be removed by an operator.

Other objects and advantages of this invention will become apparent from the following description taken in connection with the accompanying drawings, wherein are set forth by way of illustration and example, certain embodiments of this invention.

FIG. 2 is a partly sectional front view of the entire continuous sole cutting system.

FIG. 2a is a cross sectional view of the conveyor belt along 2a—2a of FIG. 2.

FIG. 2b is an enlarged view showing a bar positioned across the conveyor belt and showing the twist given to the rind before it enters the rind removal system.

FIG. 3 is an enlarged view showing the location of the cam control on the cutting machine and a front end view of the rind removal system.

FIG. 4 is an enlarged broken away side view along 4—4 of the cutting machine showing the cam control which actuates the main conveyor belt drive.

FIG. 5 is a top view of the entire continuous sole cutting system.

FIG. 5a is an enlarged sectional view along 5a—5a showing a convex plug or hump mounted under the conveyor belt.

FIG. 6 is an enlarged broken away view of the conveyor belt intermittent drive s howing the electrical controls schematically.

FIG. 6a is a cross sectional plan view of the switching mechanism of FIG. 6 along 6a—6a thereof.

FIG. 6b is an enlarged broken away view of FIG. 6 showing the mechanism of the switch and actuator, the latter being mounted on the piston rod yoke.

FIG. 6c is a schematic drawing of the electrical control circuit shown in FIG. 6.

FIG. 7 is an enlarged side view of the rind removal system showing the driving control means therefor.

Figures 1, 1A:
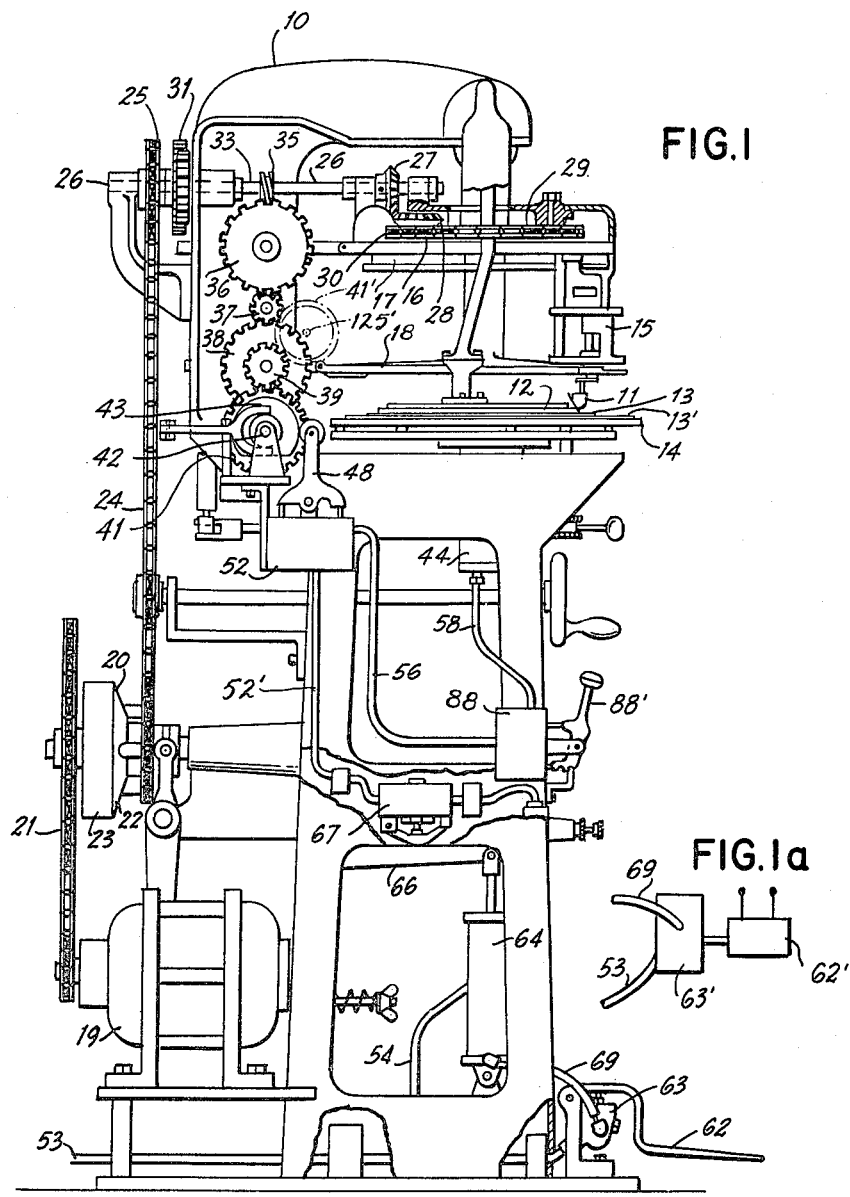
FIG. 1 is a side view, partly sectional of the major components of the cutting machine.
FIG. 1a is a modification of the cutting machine showing the components that may be used to provide electrical actuation instead of pedal actuation.

In order to understand the principles and mechanisms embodied in this invention, it is first necessary to discuss the sole cutting machine shown at FIG. 1.

*The sole cutting machine*

With the exception of certain modifications to be discussed hereinafter, the sole cutting machine shown in FIG. 1 is essentially that which is disclosed in patent application Serial No. 57,689 filed on September 22, 1960, by Herbert R. Polleys, now Patent No. 3,006,006, the disclosure of which is incorporated into this patent by this reference.

Referring now to FIG. 1, there is shown a cutting machine 10 comprising a cutting knife 11 which is driven around a templet having the contour of the sole. This knife cuts the sole from a sheet of sole stock 13 of rubber. This stock is supported on a cutting pad 13' carried by a movable table 14 and is clamped between an outsole templet 12 and the table. (As used herein, the term "rubber" includes natural or synthetic rubbers, and rubber-like plastics.) This means for driving the cutting knife 11 in a circuit around the templet 12 includes carriage 15, which is directly connected to and driven by chain 16. The carriage 15 is guided in a circuit above the templet 12 by the upper and lower guide tracks shown further in Patent No. 1,270,319 to E. L. Patten.

Chain 16 as well as chains 21 and 24 are driven by a motor 19 through a clutch 20 one-half of which is directly coupled to chain 24. When the engageable and disengageable parts 22 and 23 of the clutch 20 are in engagement, knife 11 is driven from the clutch 20 through the chain 24, which meshes with the sprocket wheel 25 keyed to a shaft 26.

Shaft 26 drives miter gears 27 and 28, the latter having sprocket 30 fixedly attached thereto. Chain 16 passes around drive sprocket 30 and idle sprocket 29 to drive carriage 15 around its circuitous path.

The means to reciprocate the track is seen in FIG. 1. The track guides 17 and 18 are shifted horizontally by a train of gears which is driven from the shaft 26 by a gear 31 which is keyed to a shaft 33, on which a spiral gear 35 is also keyed and which drives the train of gears 36, 37 and 38. This reciprocates the track guides 17 and 18. Gear 39 fixed to gear 38 is adapted to drive gear 41 which is slidably mounted on a shaft 42.

A wide faced cam 43, slidably mounted on shaft 42 and affixed to gear 41, controls the rise and fall movements of table 14 and synchronizes them with the travel of the knife 11 by allowing fluid under pressure to be admitted to and exhausted from the lower end of cylinder 44 to operate the piston therein. This lifts and drops table 14. The mechanism for performing such functions is described more fully in the aforesaid Polleys patent application.

As described in Patent No. 2,469,518 issued to H. R. Polleys on May 10, 1949, the movement of the sole stock by the supporting table into and out of the path of the cutting knife is controlled by and is synchronized with the travel of the knife in such a manner that when the knife has started to operate, the machine may be operated continuously at a substantially constant high speed while all of the soles are cut from a single piece of sheet stock. During such operations, the stock is automatically carried into the path of the knife and removed therefrom while the knife is in the desired position on its path of travel to cause the knife to enter and be withdrawn from the cut at the desired preselected position on the edge of the soles being cut. Such position can be preselected.

The table 14 is reciprocated through one cycle, that is moved up and down, during the time the knife travels twice around its path of movement. The stock is held in the path of the knife while the knife makes slightly more than one revolution, and it is held out of the path of the knife while it completes the remaining portion of the revolution, which is slightly less than one revolution. Such operating characteristics are obtained by driving the cam 43 through one revolution while the knife 11 is driven through two revolutions, and making the high portion of the cam extend through an angle of slightly more than 180°. It will be understood that the gear ratio between the knife drive and the cam 43 and/or the angular length of the high portion of the cam in respect to the low portion may be changed to cause the stock to be held in the path of the knife during a plurality of revolutions of the knife, with or without changing the angular travel of the knife while the stock is being shifted on the table.

It is seen that table 14 is actuated by the extension of the piston of cylinder 44. Fluid to actuate cylinder 44 is supplied through pipes 58, valve 88, pipe 56, valve 52, pipe 52', three-way valve 67, pipe 54, and inlet supply pipe 53. Fluid to actuate cylinder 64 (which in turn actuates clutch 20) is supplied from pipe 53, normally closed foot valve 63, and pipe 69.

If it is desired to operate the cutting machine 10 electrically instead of manually depressing pedal 62, the components shown at FIG. 1a may be used. As shown, the pressurized fluid is received from inlet 53 and conducted through a solenoid actuated valve 63' which is normally closed. Solenoid 62' may be actuated in a conventional manner by providing an electrical power supply in series therewith and depressing a button or other switch (not shown) closing contacts also in series therewith. Upon depressing this button, solenoid 62' is energized opening valve 63' allowing the fluid to pass through pipe 69 to expand cylinder 64. A more complete description may be had by referring to the above mentioned patent 3,006,006.

The conveyor belt

The conveyor belt 101 shown at FIG. 2a comprises two components; a cutting belt surface 101a and a drive belt 101b. Drive belt 101b may be a conventional, long lasting fabric rubber conveyor belt. Belt surface 101a is a removable rubber or composition surface having dimensions similar to belt 101b and is secured to belt 101b by pressure adhesive strips along the two edges only. When belt surface 101a is cut by the operation of the cutting knife 11 a sufficient number of times so as to become worn and ready to be discarded, the adhesive strips are removed and a new belt surface is substituted for the old one. New pressure adhesive strips are then applied.

In order to increase the life of this rubber surface, "knitting" means 121 and 122 (see FIG. 2) are mounted adjacent roll 103. Each means comprises a heavy roll 123 which is frictionally rotated in contact with belt 101 as it passes over roll 103. The surface of the roll in contact with belt 101 has staggered grooves and high spots which act to knead or knit the belt cuts on the belt surface and to prevent pieces of rubber from being torn from the belt surface and passing out through the cuts to contaminate subsequently cut soles.

Conveyor belt movement and control

The conveyor belt 101 on which the sole stock is placed is fixed in position by being entrained over large rolls 102 and 103. Idlers 104 and 105 are secured to the base of a supporting structure 106. Supporting structure 106 may be conventional and comprises vertical bars secured to the floor on which the entire machine is located and having the necessary brackets and connecting bars associated therewith. Rolls 102, 103 and idlers 104 and 105 are positioned to keep conveyor belt 101 in tension. The tension to which this belt is subjected may be varied by adjusting a conventional screw feed bearing positioning element 107 which is rigidly connected to, and controls the horizontal position of, the shaft 102' of the roll 102. Conveyor belt 101 is in close frictional contact with rolls 102 and 103, the movement of which is controlled by the drive mechanism coupled to roll 103.

The drive mechanism of the conveyor belt

As shown at FIGS. 2 and 6, the conveyor belt drive comprises a pneumatic motor or cylinder 111 which is pivotally mounted in clevis 112 which is rigidly attached to a horizontal member 113 secured to vertical bars of the support structure 106. The actuation of motor 111 causes piston rod 114 to extend. The upper end of piston rod 114 carries a yoke 114' coupled to an arm 115 rotatably coupled to the shaft 116 (which drives the roll 103) by an overrunning clutch. The rotation of roll 103 and hence the movement of conveyor belt 101 may be instantaneously stopped by means of the brake structure 140 to be described further later.

Stock alignment

In order to operate efficiently and reduce the amount of rind, the width of the stock which passes under the blade of the cutting machine 100 should be only slightly larger than the length of the longest sole to be cut. If the stock width is increased, the rind between the edge of the stock and the outline of the sole will provide greater tolerance in the alignment of the stock, but will also increase the amount of wasted material. Further it is mandatory that the heel breast line be accuately positioned with respect to the contour of the sole. Thus, tolerances must be kept to a minimum and the stock therefore must be accurately positioned in the cutting machine 100. This necessitates precise stock alignment on the conveyor belt 101.

The stock may be arranged on belt 101 in many ways. As one alternative, shown at FIG. 5, the stock may be cut into longitudinal slabs 13 and then either butted or spliced together at the cut ends so as to form a continuous feed into and out of machine 100. Alternatively, the slabs may overlap one another by approximately an inch or so as shown at 14'. Alternatively, the stock may be wound as a roll on a drum, the stock roll can then be fed directly from the drum onto the conveyor belt 101. Under all circumstances, care must be taken to be certain that the stock has shrunk to the extent that it ever will before the sole is cut. That is, when the stock is calendered, it is necessary to wait some time or give it special "anti-shrink" treatment to allow the stock to shrink its normal amount.

In order to align the stock properly it may be desirable to provide the calender rolls (which form the stock) with a circumferential, very thin protrusion at the center thereof, such as a very thin roller or a dull blade positioned at the longitudinal center thereof. As the stock emerges from the calender, there will appear a very thin longitudinal line 15' at the center thereof. Alternatively, the heel breast line which forms the edge of the heel between the sole and heel may be used. Line 15' or the heel breast line is herein referred to as a reference line.

In order to utilize line 15' or the heel breast line, light alignment means are provided at 118 as shown at FIG. 2. This means comprises a shade 119 enclosing a relatively thin beamed light source 120 approximating a point source. Positioned somewhat below light source 120 and securely mounted to the shade 119 is a thin wire or other opaque member 120a. Wire 120a extends longitudinally in relation to the conveyor belt and stock and in conjunction with light source 120, a shadow line is cast on the stock having approximately the same width as line 15' formed in the conveyor stock. In order then to align the stock properly, the operator merely moves the stock until the line 15' or the heel breast line coincides with the shadow cast by the light alignment means 118. To further facilitate alignment, cutting machine 100 is mounted on angle iron runners (not shown) which allow the entire unit to be transversely moved in and out. In this way, line 15' or the heel breast line is selectively aligned with a line which may be made, if desirable, on the cutting form templet to represent the heel line. Means may be provided to move the cutting machine along the angle iron runners.

Stock feed movement and control

The requirements of the feed control are that the stock be advanced a distance only slightly more than the widest dimension of the sole to be cut. Further it is necessary that the stock be absolutely stationary while the cutting operation occurs. This necessarily requires an intermittent type of conveyor motion producing means.

The knife 11 rotates continuously, and actually revolves twice for each sole cut; that is, during one revolution, the sole is cut and during the second revolution the knife is separated from the sole stock and does not actually cut any stock. During the time period of the second revolution the conveyor belt 101 is advanced. After the first revolution cam 125 mounted on shaft 125' which in turn is coupled to gear 41' which meshes with gear 39, (see FIGS. 1 and 4) touches contact 126 to close switch 127. Cam 125 thus revolves once through appropriate mechanical linkages for every two revolutions of cutting knife 11. The closure of switch 127 initiates the advance of conveyor belt 101.

The electrical control system used to drive conveyor belt 101 is shown diagrammatically at FIG 6 and in more detail at FIG. 6c. Referring now to FIG. 6, the closure of switch 127 actuates a relay circuit 128 which in turn energizes solenoid 129. Solenoid 129 controls a two position four-way air valve 130 with an exhaust manifold 130'. When solenoid 129 is energized, the valve 130 opens to allow air from a supply (not shown) to flow through pipe 131 to expand cylinder 111 and open the rod end to exhaust. Cylinder 111 is mounted on a clevis 112 to an overall supporting structure 113.

As cylinder 111 is expanded, piston rod 114 is extended. This rod is coupled to arm 115 by means of yoke 114' so that arm 115 is rotated as rod 114 is extended or retracted. Arm 115 is rotatably coupled to shaft 116 of drum 103 so that when rod 114 is extended, drum 103 revolves moving conveyor belt 101 a distance equal to the distance traveled by the outer surface of the drum. However, arm 115 is coupled to shaft 116 by an overrunning clutch mechanism 117 which acts to allow shaft 116 to rotate in only one direction, clockwise. There is no connection between clutch 117 and the brake 140. The clutch is essentially a ratchet and pawl device, the pawl engaging the geared ratchet on the upward stroke, thereby moving roll 103 in the clockwise direction. The clutch is so arranged that the pawl does not engage the ratchet grooves on the downward travel. The ratchet portion of the clutch is attached to the shaft of the drum, while the pawl is attached to the arm. During the upward travel of the piston rod 114, the two position control valve 130 is so positioned as to allow the air above the piston to be expelled from the system.

The extent of travel of piston rod 114, and therefore the degree of rotation of drum roll 103 is determined by the position of an adjustable nut 132 to which is secured an electrical switch with contact arm 133 (FIGS. 6 and 6a). The vertical position of nut 132 and contact 133 is determined by the rotation of bevelled gears 134 and 135 which in turn are controlled by the manual setting or rotation of knob 144 attached to joining shaft 145. As shown at FIG. 6a, the key movable element in the switch structure is nut 132. When bevelled gears 134 and 135 are rotated, threaded rod 135' rigidly coupled to gear 135 rotates, and since threaded nut 132 is slidably confined by bar 132' (see FIG. 6a), it will move upwards or downwards depending on the direction of rotation imparted to the threaded rod. When contact is made at 133 as a result of contact with striker 136 mounted on yoke 114' of piston rod 114, relay 128 is opened thereby deenergizing solenoid 129. This repositions the two position control valve 130 to allow air to flow into cylinder 111 through pipe 131' in such a manner as to force the piston 114 downward. Air is exhausted ahead of the piston face. Air pressure remains on top of the piston as the cam 125 makes contact with element 126 to again close switch 127 for repeat operation.

At such time as relay 128 is opened, an electrical timer 140' is set into operation which energizes a stationary electro-magnet 141. Disc 142 faces electromagnetic disc 142', and is separated therefrom by a small distance, such as a few thousandths of an inch. Disc 142 is attached to the end of the drum shaft 116, as shown diagrammatically only, at FIG. 6. When the electromagnet is energized, discs 142 and 142' become frictionally coupled and rotating disc 142 attached to the drum shaft 116 is instantly gripped, thereby causing the drum to be positively braked.

The timer is adjustable, and is set for a relatively short interval, such as a fraction of a second. The purpose of the brake is to stop the motion of the roll 103 after it is set in motion by the upward force of the clutch arm 115 in combination with the clutch assembly. It is essential that the electro-magnet timer be set so that the electro-magnet is deenergized before the clutch arm 115 again begins its next upward cycle. There is no connection between the clutch 117 and the timer or the clutch and the brake as mentioned before.

Drive control circuit

The details of the electrical system shown in FIG. 6 will now be explained in further detail, reference being made to FIG. 6c.

At the end of the cutting cycle, cam 125 momentarily closes switch 127 (see also FIG. 4) and the source of direct current 190, is connected across solenoid 129 from line 180 through switch 128, line 184, solenoid 129, line 183, thence to lines 182 and 181. Inasmuch as the closure of cam 125 is only momentary, a hold circuit is established by the actuation of relay 128 which closes switch 128'. The hold circuit appears from source 190, line 186, normally closed contact of switch 132, contact 128', line 184, solenoid 129, line 183, thence to lines 182 and 181. The actuation of solenoid 129 operates two position valve 130 as previously described, which starts drum 103 rotating. When striker 136 attached to yoke 114' of piston rod 114 moves contact 133 to reverse the position of switch 132, the hold circuit for solenoid 129 is opened, and valve 130 reverses its position causing piston rod 114 to retract.

At the same time that solenoid 129 is deactuated, the timer 140' is actuated through the circuit comprised of lines 181, 187, timer 140', 188, contact element 133, and line 186.

When the timer 140' is actuated, solenoid 141 is immediately actuated, operating the brake 117 composed of discs 142 and 142'. As explained previously, the timer only operates for a short interval and solenoid 141 is controlled by the internal mechanism of this time. Although the time operates for only a short interval (which necessarily results in the brake being open after the expiration of the short interval), the brake almost instantaneously stops the motion of drum 103, and after the drum has been halted, the operation of overriding clutch 117 is sufficient is prevent the drum from moving in reverse direction.

Rind removal

The rind part of the stock 13 is now to be placed on conveyor belt 153 shown at FIGS. 2, 5 and 7, which may lead into some type of scrap bin, or an operator may be positioned along the path of movement of conveyor belt 153 to remove the rind. After the soles have been cut and the slab passes under control wheel 166 and under elongated roller 158 (FIG. 2b) capable of rotating to prevent dragging on the stock surface, the rind part of the slab also 121 is lifted at its ends by an operator and passed between the nips of rollers 151 and 152. The upward lift applied to rind must not be imparted to the sole stock located under the cutting head of cutting machine 100. The stock at that location must be absolutely flat.

In order to insure that the stock under the cutting machine is absolutely flat, the aforementioned horizontal elongated roller 158 is positioned parallel to the surface of the stock and at an angle of approximately 45° to the side of the conveyor belt or stock shown at FIGS. 2 and 2b. This roller covers less than half the width of belt 101. To remove rind 121 from the conveyor belt 101, the operator grips the rind stock at its edges and moves it to the nip of rollers 151, 152. Thus the left edge of the rind stock (looking towards the feed) enters the rollers 151 and 152 at their respective right side as viewed at FIG. 2 to prevent a portion of the rind shown at 122 of FIG. 2b from being lifted, and hence lifting or pulling the stock under the cutting head of cutting machine 100, which could occur if rind 121 was fed between rollers 151 and 152 too quickly. Even with the use of roller 158 and the application of the steps just described, it is still possible for the rind 122 to be lifted and therefore a lift control means (a means to control the distance that the rind rises from the conveyor belt before passing roller 158) is provided at 170 to be explained in conjunction with FIGS. 3 and 7.

A hold-down roller 158 (FIG. 2b) mounted on supporting bracket means may be used to hold the edge of belt 101 down so that the stock may be readily gripped by the operator.

Before explaining the operation of the lift control means, it is necessary to understand the drive for conveyor belt 153. Referring now to FIG. 7, conveyor belt 153 passes between rollers 151 and 152 and is entrained around rollers 152, idler 157, drive roll 159, idler 158, roller 155 and idler 154. A tensioning device is provided at 156 to move the longitudinal position of roller 155. The part of the conveyor belt 153 which is entrained over drive roll 159 is frictionally engaged therewith so as to be coupled thereto.

Drive roll 159 is coupled by a belt or similar transmission means 160 to a direct drive roll 162 which is coupled to a pneumatic motor 163. Fluid or in this case air to drive motor 163 is provided from a source not shown and passed through a variable valve 164 through a flexible conduit 165 and thereafter applied to motor 163. This motor may be turned on and off through conventional means such as an electrically operated valve positioned adjacent to the switch which turns on the entire electrical system to operate the cutting machine or conveyor belt 101. The speed of the motor 163 is determined by the amount or pressure of air which is supplied thereto through valve 164 and conduit 165.

Referring now also to FIG. 2b, FIG. 3 as well as FIG. 7, if the rind 121 rises excessively because motor 163 is operating too rapidly pulling rind 121 on conveyor belt 153, the rise will be sensed by caster 166 (whose rotational axis is positioned to allow it to rotate as belt 101 moves) which will be lifted to the same extent that the rind stock 122 is lifted.

Caster unit 166 is connected to a rod 167 through a small shaft mounting 167' (FIG. 3) so as to allow the caster to rotate about an axis in mounting 167'. Rod 167 is attached to arm 168 which in turn is connected to a valve operating lever 169 (shown at FIG. 3) The zero or rest position of caster 166 can be adjusted as desired.

The movement of arm 168 and lever 169 upwards decreases the valve opening in variable valve 164 so as to decrease the supply of air to motor 163 and hence reduce the speed thereof. The reduction of speed of motor 163, decreases the speed of conveyor belt 153 and the pull on rind 121 and will necessarily result in a lowering of the lifted rind stock 122, preventing rupture of the continuous or endless rind strip.

Sole removal

The soles 180 which are cut by the cutting machine 100 pass under rod 158 and also under the rind removal station 150 (FIG. 5). The soles 180 remain adhesively on conveyor belt 101 until they pass over a hump 182 beneath the belt shown at FIGS. 2, 5 and 5a which is rigidly positioned under the conveyor belt 181. As the soles 180 pass over the hump, the forward edge 181 of the sole clears the conveyor belt 101 and loses contact therewith. The operator who removes the soles may grip them at this forward edge quickly and does not have to pry the soles from conveyor belt 101, thus preventing distortion and damage by handling.

Operation

The operator places the templet 12 and associated connecting structure in cutting machine 100 and aligns the reference line on the sole stock with the shadow line. The automatic cutting operation is ready to start.

Separate start means are actuated to start motor 19, and pedal 62 or switch 62' is closed. The up and down motion is controlled by cylinder 44 as explained previously and in the aforementioned patent application. After a sole has been cut, cam 125 actuates switch 127 causing conveyor belt 101 to advance. When the conveyor has advanced the desired distance, brake 140 instantaneously stops the motion and the next sole is cut as cylinder 111 operates clutch 117 to prevent belt 101 from moving in reverse direction. The rate at which the rind is removed is carefully controlled so as to synchronize its speed with the stripped stock under the cutting machine. The soles which have been cut, advance on the conveyor belt until they pass over hump 182 where they are removed by an operator.

Having thus described our invention, what we claim and desire to protect by Letters Patent is:

1. A continuous sole cutting system comprising: an endless conveyor belt for transporting substantially endless sole cutting stock; a sole cutting machine positioned in the path of said conveyor belt; said sole cutting machine comprising a cutting knife, means mounting said knife for movement in circuit about a templet having the desired sole form, and means for rotating said knife in circuit; means responsive to said rotating means for intermittently driving said conveyor belt; a second conveyor belt positioned close to said first conveyor belt and being adapted to receive the rind; means for driving said second conveyor belt; means positioned after said cutting machine to detect a rise of said rind from said first conveyor belt; and means responsive to the detected signal from said detection means to control the speed of said second conveyor belt.

2. A continuous sole cutting system comprising: an endless conveyor belt for transporting substantially endless sole cutting stock; a sole cutting machine positioned in the path of said conveyor belt; said sole cutting machine comprising a cutting knife, means mounting said knife for movement in circuit about a templet having the desired sole form, and means for rotating said knife in circuit; means responsive to said rotating means for intermittently driving said conveyor belt; a second conveyor belt positioned close to said first conveyor belt and being adapted to receive the rind; means for driving said second conveyor belt; means positioned after said cutting machine to detect a rise of said rind from said first conveyor belt; means responsive to the detected signal from said detection means for controlling the speed of said second conveyor belt; and means for separating the front edge of the cut sole from the upper surface of said first conveyor belt comprising a substantially rigid convex surface positioned close to said first conveyor belt and being adapted said second conveyor belt.

3. A continuous sole cutting system comprising: an endless conveyor belt for transporting substantially endless sole cutting stock having a reference line thereon; a sole cutting machine positioned along the path of said conveyor belt; means for indicating the alignment of the stock with respect to the position of said sole cutting machine; said sole cutting machine comprising a knife, means mounting said knife for movement in circuit about a templet having the contour of a sole to be cut, means for rotating said knife, means for clamping said stock in position in the path of said knife for cutting during the period of a first knife rotation and for releasing said stock after said first knife rotation; a switch mounted on said cutting machine; means coupled to said rotating means for de-actuating and actuating said switch; said switch being de-actuated and actuated once for every two complete rotations of said knife; means responsive to the operation of said switch for intermittently moving said conveyor belt, after said switch is actuated said belt being moved for a time period no longer than the period of a second knife rotation.

4. A continuous sole cutting system in accordance with claim 3 including means for removing the rind after the sole is cut; said ring removal means including a conveyor system; means for driving said conveyor system; means for restraining the rind from being lifted off the surface of said conveyor belt comprising a roller positioned at an angle to cross said conveyor belt; detecting means positioned before said roller for detecting any rise of said rind from said conveyor belt; and means responsive to said detecting means for controlling the speed of said conveyor system.

5. A continuous sole cutting system comprising: an endless conveyor belt for transporting substantially endless sole cutting stock having a reference line thereon; a sole cutting machine positioned along the path of said conveyor belt; means for indicating the alignment of said stock with respect to the position of said sole cutting machine; said sole cutting machine comprising a knife, means mounting said knife for movement in circuit about a templet having the contour of a sole to be cut, means for rotating said knife; a switch mounted on said cutting machine; means coupled to said rotating means for opening and closing said switch; said switch being opened and closed once for every two complete rotations of said knife; means responsive to the operation of said switch for intermittently moving said conveyor belt; after said switch is closed said belt being moved for a time no longer than the period of one knife rotation; means for removing the rind formed after the sole is cut; said rind removal means including a conveyor system; means comprising a fluid motor for driving said conveyor system; means for restraining the rind from being lifted off the surface of said conveyor belt comprising a roller positioned at an angle across said conveyor belt; detecting means positioned before said roller for detecting a rise of said rind from said conveyor belt; and means responsive to the rise of the rind to control the speed of said conveyor system; said speed control means comprising said fluid motor and means for controlling the supply of fluid to said motor; said last-mentioned means being responsive to said detecting means.

6. A continuous sole cutting system in accordance with claim 5 in which said rind removal means includes two rollers adapted to receive the rind at their nip and transfer it onto the second conveyor belt.

7. A continuous sole cutting system comprising: a first endless conveyor belt for transporting stock having a reference line thereon; a sole cutting machine; means for indicating the alignment of the stock with respect to the position of the sole cutting machine; means for correlating the time required to cut a sole with the time that the conveyor belt is at rest; means for intermittently driving said conveyor belt; means for controlling the distance that said conveyor belt moves at each intermittent movement; and means for removing the rind; said rind removal means comprising a second conveyor belt positioned above said first conveyor belt transversely thereto; means for driving said second conveyor belt; means for preventing the rind from moving upwards at the cutting machine when placed upon said second conveyor belt; means responsive to an upward displacement of the rind to control the speed of said second conveyor belt.

8. A continuous sole cutting machine comprising: an endless conveyor belt; means for intermittently starting and stopping said conveyor belt; said conveyor belt having a removable top surface formed of rubber and being adhesively but removably secured to the bottom layers of said conveyor belt; means for cutting soles from sole stock on said conveyor belt; means for removing the rind after soles have been cut; said rid removal means comprising a conveyor system; means for driving said conveyor system; means for controlling the speed of movement of said conveyor system; and means for kneading the removable top surface of said conveyor belt.

References Cited by the Examiner

UNITED STATES PATENTS

| 2,235,960 | 3/1941 | Curtis | 83—107 |
| 2,469,518 | 5/1949 | Polleys | 12—86.6 |

JORDAN FRANKLIN, *Primary Examiner.*